United States Patent [19]
Sawyer et al.

[11] 3,820,311
[45] June 28, 1974

[54] HARVESTING MACHINE DRIVE MEANS

[75] Inventors: Bobby Gene Sawyer; Robert Charles Francis, both of Ottumwa, Iowa

[73] Assignee: Deere & Company, Moline, Ill.

[22] Filed: June 26, 1972

[21] Appl. No.: 266,210

[52] U.S. Cl.............................. 56/14.4, 56/DIG. 1
[51] Int. Cl.......................................... A01d 49/00
[58] Field of Search............... 56/DIG. 1, 14.4, 14.5, 56/11.6

[56] References Cited
UNITED STATES PATENTS
3,722,191 3/1973 Braunberger.................... 56/DIG. 1
3,729,907 5/1973 Braunberger et al................ 56/14.1

*Primary Examiner*—Antonio F. Guida

[57] ABSTRACT

Drive means for a crop harvesting machine of the mower-conditioner type having a transverse mowing apparatus including a drive mechanism therefor with a drive input sheave on one side of the machine, and a pair of cooperating conditioning rolls having drive input shafts on the same side of the machine, one of the rolls being mounted on the machine for movement toward and away from the other roll, the drive means including a drive transmission housing mounted on the side of the machine for vertical pivotal adjustment, the drive housing having an input shaft adapted for driving connection to a power source, a drive output sheave spaced vertically from the drive input sheave of the mowing apparatus drive mechanism, and a pair of drive output shafts generally aligned with the drive input shafts of the conditioning rolls. An endless belt drivingly connects the input sheave of the mowing apparatus drive mechanism and the output sheave of the drive housing, the tension in the belt being variable in response to vertical pivotal adjustment of the drive housing, and a pair of telescoping, universally connected drive shafts drivingly connect the drive housing output shafts with the conditioner roll input shafts, the latter connections accommodating misalignment of the shafts which results from vertical adjustment of the drive housing to tension the mowing apparatus drive belt and movement of the upper roll relative to the lower roll.

15 Claims, 5 Drawing Figures

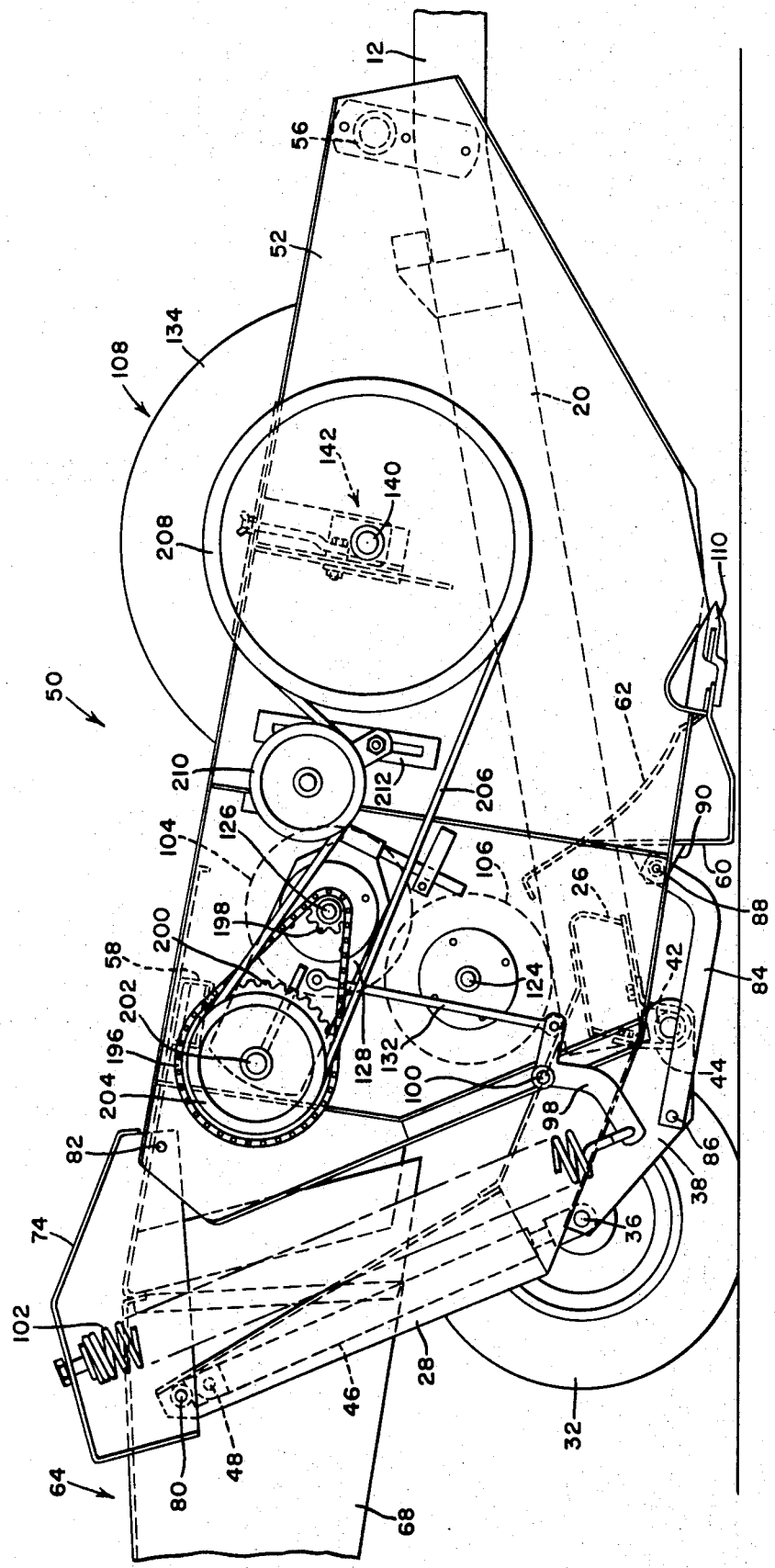

HARVESTING MACHINE DRIVE MEANS

BACKGROUND OF THE INVENTION

The present invention relates generally to crop harvesting machines and more particularly to drive means for the power operated harvesting elements on a machine of the mower-conditioner type.

A conventional pull-type mower-conditioner includes an L-shaped main frame adapted at its forward end for attachment to the drawbar of a tractor and having a transversely spaced pair of ground-engaging wheels mounted on its transverse rear portion and adapted to support the frame for movement through a field. Suspended from the transverse frame portion is a subframe or header having a tranverse cutter bar disposed along its lower leading edge for cutting a swath of crop material as the machine is advanced forwardly, an upper and lower pair of crop conditioning rolls mounted upward and rearwardly from the cutter bar, the conditioning rolls being operative to condition the stems of the cut crop material and discharge the same rearwardly, and a harvesting reel for directing the standing crop into the cutter bar and transferring the cut crop upwardly and rearwardly from the cutter bar to the conditioning rolls. The upper conditioning roll is conventionally mounted on the frame to move toward and away from the lower roll.

Various methods have been employed to suspend the header from the main frame for relative vertical floating movement so that the header can closely follow the contour of the ground and also raise to clear obstructions. One such method consists of mounting the header on the main frame for vertical movement about a single transverse pivot axis. On machines of this type, the drive train for transmitting power from the tractor power take-off shaft to the cutter bar, conditioning rolls and reel on the header conventionally includes a frame-mounted bevel gearbox having an output shaft aligned with the header pivot axis and drivingly connected to the input shafts of the power operated harvesting elements, the center-to-center distances of the output and input shafts thereby remaining constant as the header pivots relative to the main frame. Another such method consists of mounting the header on the main frame by means of upper and lower pairs of fore-and-aft extending links. Since the header, on machines of this type, has no single pivot axis about which it moves as it floats relative to the main frame, the above-described drive means employing a frame-mounted bevel gearbox is not adaptable to this machine type. A conventional drive system used on such machines, as illustrated in U.S. Pat. No. 3,517,491, issued to Lausch et al. on June 30, 1970, includes a bevel gearbox mounted directly on the header and having an output shaft aligned with the transverse axis about which the upper conditioning roll is pivotal relative to the lower roll, the gear-box output shaft being connected to the mower drive sheave by means of a drive belt, the tension in which is variable by means of an adjustable idler sheave, and to the conditioning roll input shafts by means of sprocket and chain drive connections.

SUMMARY OF THE INVENTION

It is the primary object of the present invention to provide an improved drive means for the power operated harvesting components on a machine of the mower-conditioner type.

More particularly, it is an object to provide such an improved drive means for a mower-conditioner of the type wherein the header is suspended from the main frame by means of upper and lower links.

It is a further object to provide such a drive means affording a positive, timed drive to the crop conditioning rolls, and having a conveniently tension adjustable belt drive to the mowing apparatus.

It is yet a further object to provide such a drive means employing a single drive transmission housing mounted on the side of the machine and having an output sheave aligned with the mower drive input sheave, and drivingly connected thereto by means of an endless drive belt, and a pair of transverse output shafts generally aligned transversely with and drivingly connected to the conditioning roll input shafts, the drive housing being pivotally mounted on the machine to adjust the drive belt tension, and the drive connections between the drive housing output shafts and the conditioning roll input shafts including means for accommodating misalignment of the shafts resulting from such pivotal adjustment of the drive housing and from movement of the upper roll relative to the lower roll.

A still further object of the invention is to provide such a drive means characterized by its simplicity, reliability, and ease of adjustment.

In pursuance of these and other objects, the invention comprises a drive transmission housing mounted on the side of a crop harvesting machine for pivotal adjustment, the housing including an input shaft adapted for attachment to a power source, an output sheave aligned with a mower drive apparatus input sheave, and a pair of output shafts generally transversely aligned with the conditioning roll input shafts. The sheaves are drivingly connected by means of an endless flexible drive belt, the tension in the belt being variable in response to pivotal adjustment of the drive housing. Additional connection means between the machine and drive housing is operative to releasably fix the drive housing relative to the machine. A pair of transverse, telescoping shafts drivingly connect the drive housing output shafts with the conditioning roll input shafts, the connections including means for accommodating limited misalignment of the shafts which results from adjustment of the drive housing to tension the mower apparatus drive belt, and from movement of the upper roll relative to the lower roll.

BRIEF DESCRIPTION OF THE DRAWINGS

The preferred embodiment of the invention will be described in conjunction with the accompanying drawings in which:

FIG. 5 is an enlarged, fragmentary elevational view of the right side of the machine.

DESCRIPTION OF THE PREFERRED EMBODIMENT

In the ensuing description, right- and left-hand reference is determined by facing the direction of travel of the machine.

Figure 1:
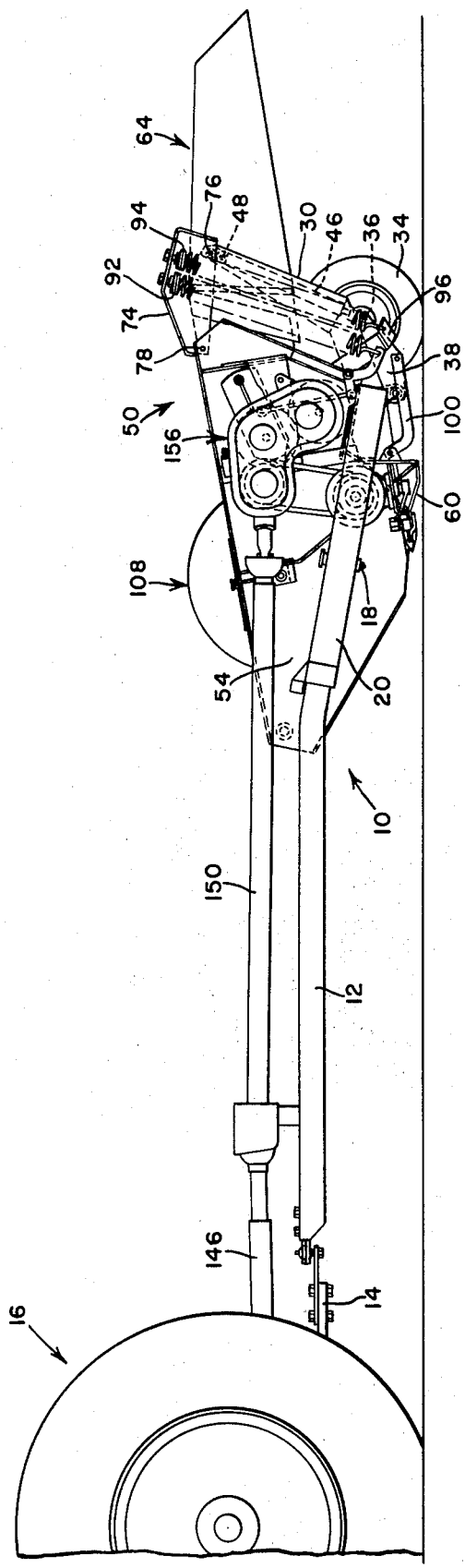
FIG. 1 is a side elevational view of a crop harvesting machine incorporating the drive means of the invention.
Figure 2:
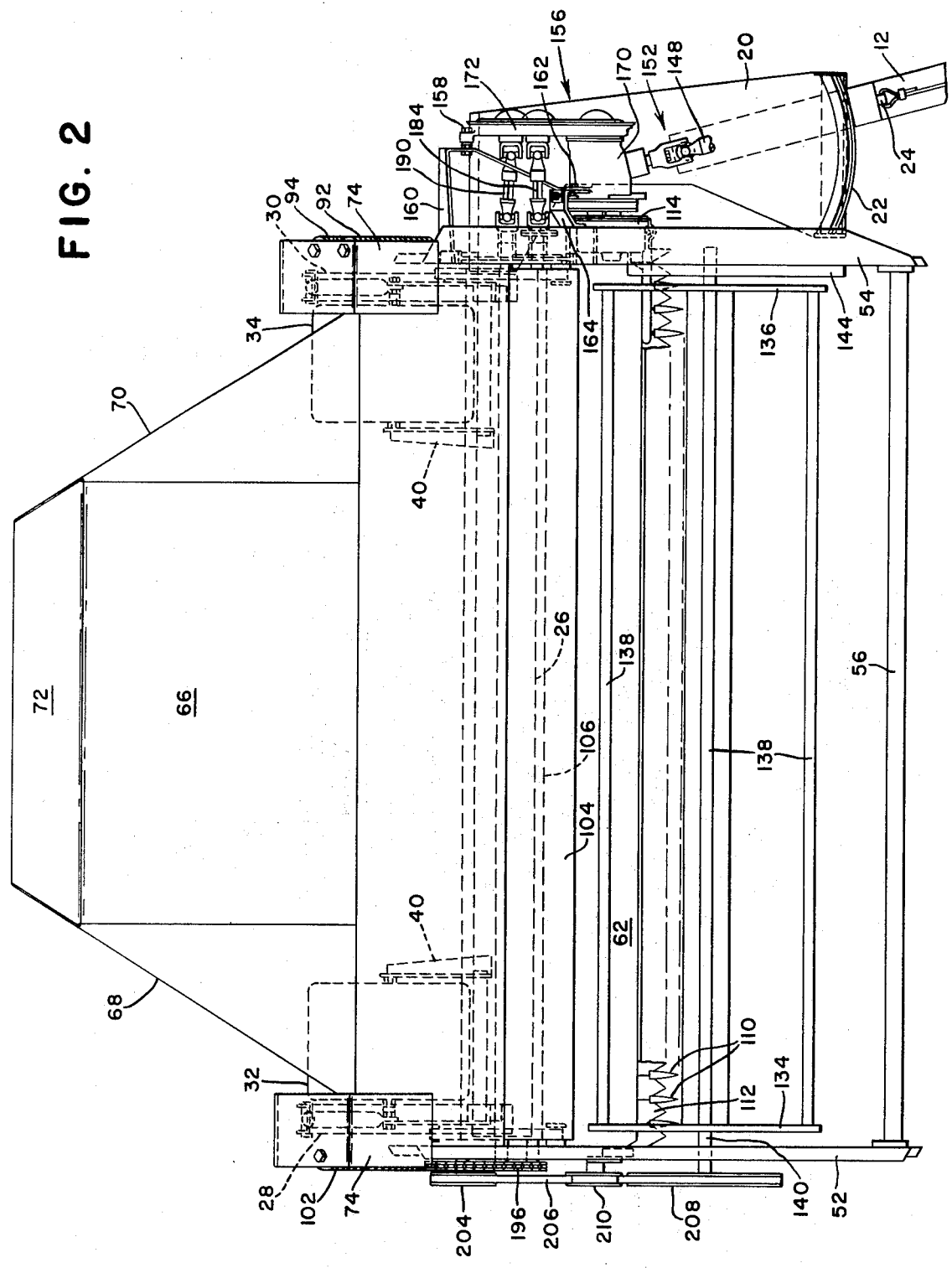
FIG. 2 is an enlarged plan view of the machine.

Referring first to FIGS. 1 and 2 of the drawings, the preferred embodiment of the invention includes a generally L-shaped main frame structure 10 comprised of a longitudinal draft portion of the left side of the machine and a transverse portion connected at its left end to the rear of the draft portion. The longitudinal portion consists of a tongue member 12 adapted at its forward end attachment to the drawbar 14 of an agricultural tractor shown partially at 16, and pivotally mounted at its rear end by means of a generally vertical pin 18 between the upper and lower sides of a box frame section 20. The section 20 has an arcuate leading edge member 22 provided with a plurality of spaced apertures into which a pin 24 carried by the tongue 12 is releasably positionable to secure the tongue 12 in various angular positions of adjustment relative to the section 20. In FIG. 2, the tongue 12 is illustrated in its extreme left position. To narrow the tractor-machine combination for transport purposes, the tongue would be swung to and secured in its extreme right position.

Fixed at its left end to the right rear portion of the section 20 is a transverse beam 26 having a transversely spaced pair of upwardly and rearwardly extending members 28 and 30 fixed to its right and left ends, respectively. A right and left pair of relatively wide, small diameter wheels 32 and 34, respectively, support the main frame structure relative to the ground, the wheels 32 and 34 being mounted on the transverse beam 26 just inwardly of the members 28 and 30, respectively. Each wheel is rotatably supported on a transverse axle 36 extending between the rear ends of an outer wheel supporting arm 38 and an inner wheel supporting arm 40, the arms 38 and 40 being interconnected at their forward ends by means of a tubular member 42 which is rotatably received in a bracket 44 fixed to the lower rear corner of the transverse beam 26. The members 28 and 30 which extend upwardly and rearwardly from the transverse frame member just outwardly of the wheels 32 and 34, respectively, are each composed of a rearwardly opening, U-shaped channel, and disposed between the walls of each member is an extensible and retractable hydraulic cylinder 46 for raising and lowering the wheels relative to the frame and thereby raising and lowering the frame relative to the ground. The upper end of each cylinder 46 is pivotally connected at 48 between the walls of its respective frame member, and the lower end thereof is pivotally connected to the extreme outer end of the adjacent wheel axle 36. The cylinders 46 are connected by conventional means (not shown) with a hydraulic fluid source on the tractor to extend and retract at the same rate of speed, so that the machine is maintained in a transversely level condition as it is raised and lowered.

Suspended from the transverse portion of the main frame 10 is a subframe or header 50 which carries the various harvesting elements of the machine. The header is formed of right and left side panels 52 and 54, respectively, interconnected at their forward ends by a transverse crop-engaging bar 56, at their upper rear ends by means of a transverse upper beam member 58, and at their lower center portions by a transverse lower beam member 60 and a transverse arcuate ramp 62. Fixed to and extending rearwardly from the side panels 52 and 54 and the upper beam 58 is a downwardly opening crop deflector hood structure designated generally by the numeral 64 and formed by a generally horizontal top wall 66, a right and left pair of rearwardly converging, generally vertical side walls 68 and 70, respectively, fixed to and extending downwardly from opposite sides of the top wall 66, and a downwardly and rearwardly inclined rear wall 72 interconnecting the rear edges of the top wall 66 and side walls 68 and 70. As is apparent from the drawings, the hood structure 64 is positioned in overlying relation to the ground wheels 32 and 34, the latter being located beneath the top wall 66 and between the side walls 68 and 70.

As described in detail in copending application Ser. No. 268,562, filed July 3, 1972, the small diameter ground wheels 32 and 34 are located rearwardly of and within the transverse extent of the mowing apparatus and conditioning rolls so that the crop discharged rearwardly from the rolls passes directly over the wheels before it falls to the ground. Also described in this copending application, though comprising no part of the present invention, are crop deflector means which may be carried by the hood structure 64, the deflector means being adjustable to form the discharged crop in either a relatively wide swath or a relatively narrow windrow.

The subframe or header 50 is suspended from the transverse portion of the main frame 10 by means of a mechanism which permits the header to "float" relative to the main frame and thereby closely follow the contour of the ground and raise to clear obstructions which are encountered. This mechanism, which is the subject of copending application Ser. No. 268,976, filed July 5, 1972 comprises, generally, upper and lower pairs of transversely spaced links which interconnect the header 50 and main frame 10, and tension spring means acting between the upper pair of links and the header. More specifically, the mechanism includes a pair of transversely spaced upper link members 74, the left link 74 being pivoted at 76 to the upper end of the left frame member 30 and at 78 to the left header side panel 54, and the right link 74 being pivoted at 80 to the upper end of the right frame member 28 and at 82 to the right header side panel 52. The suspension mechanism further includes a pair of lower link members 84, the rear ends of which are pivotally connected at 86 to the center portion of the outer wheel arms 38, and the front ends of which are pivotally connected at 88 to brackets 90 fixed to the rear wall of the transverse header beam 60.

A pair of fore-and-aft float springs 92 and 94, respectively, act between the left upper link 74 and the header to resiliently support the left side of the header relative to the main frame. The lower end of the rear spring 94 is anchored to a bracket 96 which is fixed to and extends rearwardly from the left side panel 54 of the header, while the lower end of the front spring 92 is anchored to one arm of a bell crank 98 pivotally mounted at 100 on the side panel 54. As will subsequently appear, the spring 92 acts through the bell crank 98 to provide a biasing force for the crop conditioning rolls on the header. Since the weight of the right side of the header 50 is somewhat less than that of the left side, only a single float spring 102 is employed to support this side of the header. The spring 102 is anchored at its upper end to the right link 74 and its lower end to a bell crank 98 pivotally mounted on the right header side panel 52. It will be apparent that, with the machine in its operating position, the upper and lower links of the suspension mechanism act as parallel link means to maintain the header in a constant orientation relative to the ground as it floats to follow the ground contour.

The harvesting components carried by the header include a conventional, reciprocating-type mowing apparatus extending transversely across the front side of the lower transverse beam 60, the apparatus being operative to mow a swath of crop material as the machine is advanced forwardly through a field; an upper and lower pair of intermeshing crop conditioning rolls 104 and 106, respectively, the rolls being operative to condition the mowed crop by cracking the stems thereof to facilitate the escape of moisture; and a conventional, retractable finger-type reel 108 mounted above the mowing apparatus and forwardly of the conditioning rolls to direct standing crop into the lower and advance the mowed crop up the arcuate ramp 62 from the mower to the conditioning rolls. The mowing apparatus is of a type well known in the art and comprises a plurality of transversely spaced guards 110 mounted along the front side of the beam 60, and an elongated sickle bar 112 reciprocable transversely through slots formed in the guards. Reciprocating motion is produced for driving the sickle bar by means of a conventional wobble drive mechanism contained within a housing 114 mounted on the extreme left end of the beam 60, the mechanism having a rotary input shaft 116 with a drive sheave 118 mounted thereon and an oscillating output shaft 120 connected to the left side of the sickle bar 112 by means of an arm 122.

As is clear from FIG. 2 of the drawings, the crop conditioning rolls 104 and 106 extend the full width of the header 50, between the side panels 52 and 54. The lower crop conditioning roll 106 is supported on a shaft 124 which, in turn, is rotatably mounted at opposite ends on the header side panels 52 and 54. The upper roll 104 is supported on a shaft 126, the shaft 126 being supported at its ends on parallel arms 128 pivoted at 130 to the header side panels. It will be seen that the mounting for the upper roll permits the latter to move toward and away from the fixed position lower roll, along an arcuate path about the pivot 130. As previously indicated, a downward biasing force is exerted on the ends of the upper roll by means of the float springs 92 and 102, each of which is anchored at its lower end to one of the arms of a bell crank 98. The other arm of each of the bell cranks is connected by means of a vertical connecting link 132 to one of the parallel arms 128 supporting the upper roll shaft 126. It will thus be apparent that the springs 92 and 102 serve the dual function of providing flotation for the header while simultaneously biasing the upper roll against the lower roll. Should a rock or other object be introduced between the rolls along with the crop material, the springs will stretch to allow the upper roll to move away from the lower roll a distance sufficient to pass the object without damaging the rolls or their supporting structure.

The reel 108, shown only schematically in the drawings, is also of conventional design and includes a pair of circular end panels 134 and 136 interconnected by a plurality of transverse pipe members 138. A central shaft 140 also interconnects the end panels 134 and 136 and is rotatably supported at its ends in the header end panels 52 and 54. An adjusting mechanism indicated generally by the numeral 142 is provided on the end panels at each end of the shaft 140 to permit adjustment of the reel height relative to the mowing apparatus. Conventionally, the reel pipe members 138 have a series of fingers mounted thereon which extend and retract as the reel rotates. The action of the fingers is controlled by a cam 144 mounted on the inner wall of the left side panel 54, the cam being engaged by cam followers (not shown), one of which is provided for the set of fingers mounted on each of the reel pipe members 138.

Power for driving the harvesting components on the header is supplied by the power take-off shaft on the rear of the tractor 16. A short, telescoping shaft 146 connects the tractor power take-off shaft to the front end of a main, longitudinal drive shaft 148 concealed in FIG. 1 of the drawings by a shield 150. The rear end of the shaft 148 is connected by a universal joint 152 to the forwardly extending input shaft 154 of an L-shaped drive transmission housing 156 mounted on the outer side of the left header side panel 54. The lower rear portion of the drive housing 156 is pivotally connected by means of a bolt 158 to a bracket 160 fixed to the panel 54. An additional pair of bolts 162 releasably secure the forward portion of the drive housing 156 to a second bracket 164 fixed to the side panel 54 forwardly of the bracket 160, the bolts 162 being received in arcuate slots 166 in the bracket 164 so that the drive housing can be moved through a limited arc about the axis of the bolt 158. Adjustment of the drive housing 156 about the axis of the bolt 158 is effected by means of a threaded adjusting screw 168 acting between the upper bolt 162 and the bracket 164.

The drive housing 156 is comprised of a bevel gear portion 170 and a spur gear portion 172, the former portion containing a pair of bevel gears for transmitting power from the input shaft 154 to a transverse output shaft 174 extending outwardly from the right side of the portion 170 and having an output sheave 176 mounted thereon. The spur gear portion 172 contains a driving spur gear on the left end of the shaft 174, and a pair of driven spur gears mounted on upper and lower output shafts 178 and 180, respectively, extending transversely outwardly from the right side of the portion 172. The output sheave 176 on the shaft 174 is disposed above and in the same longitudinal vertical plane as the input sheave 118 for the mowing apparatus wobble drive mechanism contained within the housing 114. An endless flexible drive belt 182 is trained around and drivingly connects the sheaves 176 and 118 to transmit power to the moving apparatus. As previously described, the entire drive housing 156, including the output sheave 176, is adjustable vertically about the axis of the bolt 158 to maintain proper tension in the drive belt 182.

Figure 3:
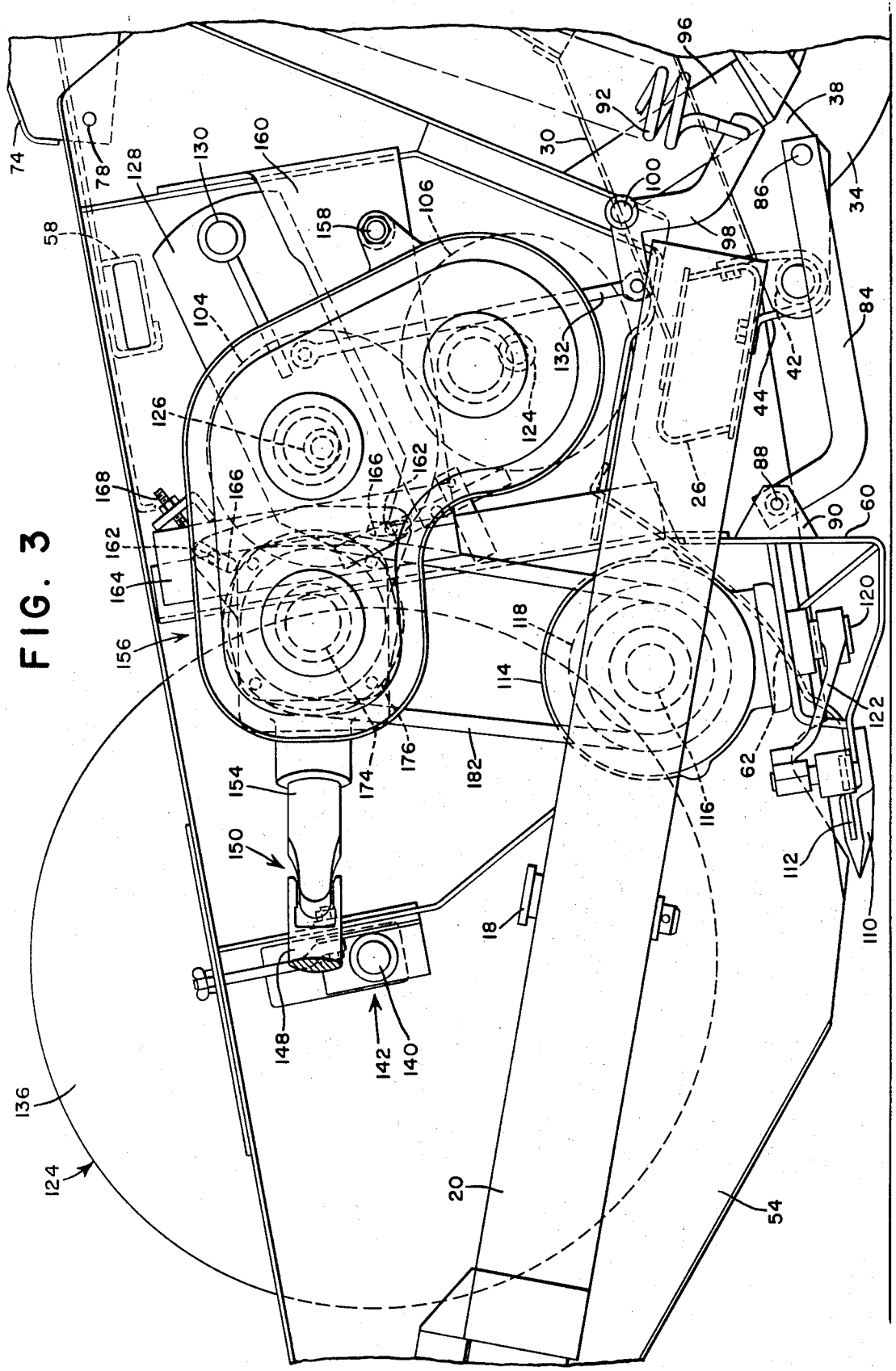
FIG. 3 is an enlarged, fragmentary elevational view of the left side of the machine, illustrating the drive means of the invention in greater detail.
Figure 4:
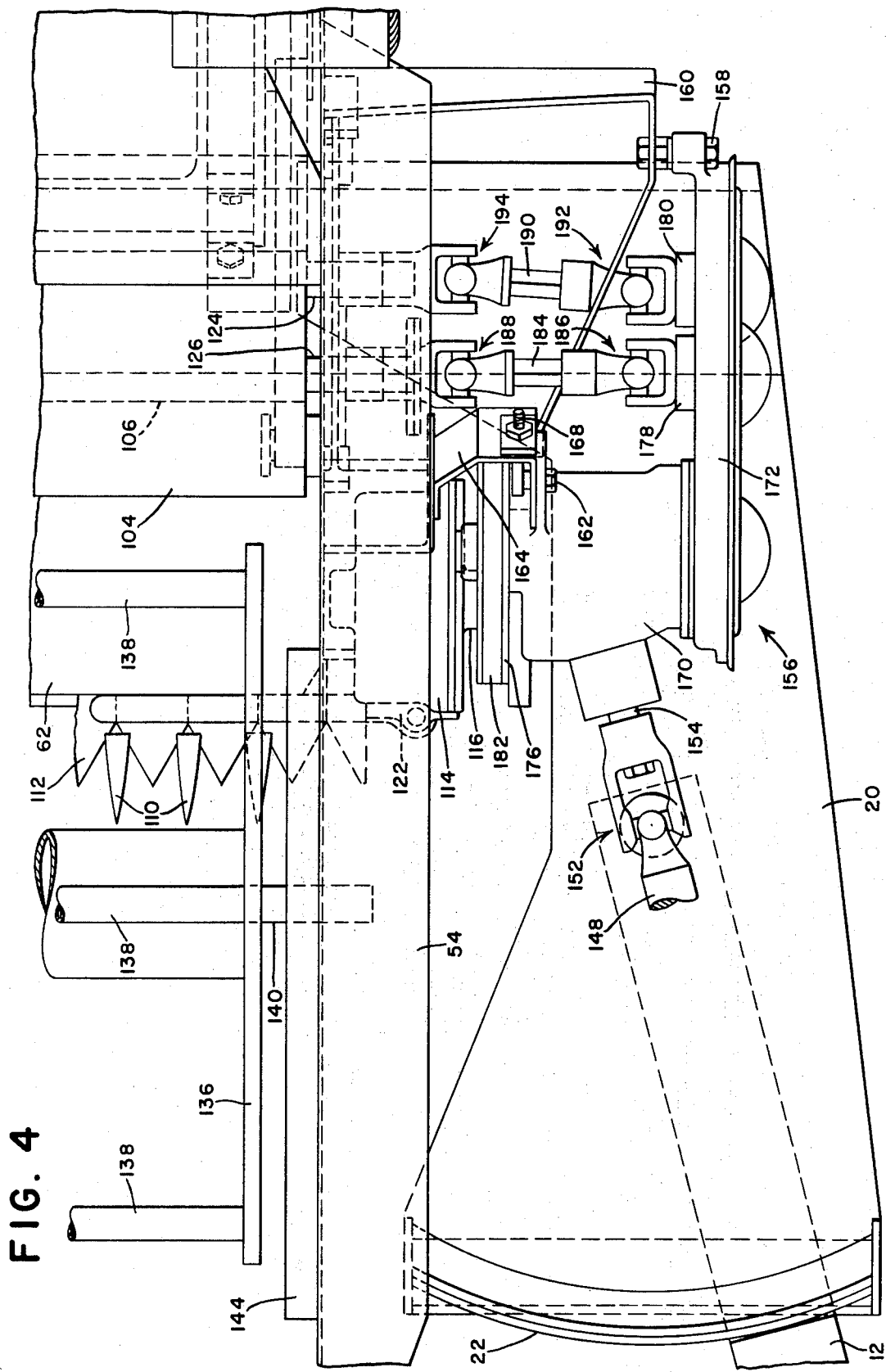
FIG. 4 is an enlarged, fragmentary plan view of the left side of the machine.

The upper and lower drive housing output shafts 178 and 180, respectively, are, as shown in FIGS. 3 and 4, generally transversely aligned with the upper and lower conditioning roll input shafts 126 and 124, respectively. It will be apparent, however, that the output shafts will move vertically relative to the input shafts as the drive housing is adjusted to restore proper tension in the drive belt 182, and further that the upper conditioning roll shaft 126 will move vertically relative to the upper output shaft 178 as the upper roll 104 moves toward and away from the lower roll 106. The resulting misalignment of the input and output shafts is accommodated by the transverse drive connections between the shafts. A short, telescoping shaft 184 is connected at its outer end through a universal joint 186 to the drive housing output shaft 178 and at its inner end through a universal joint 188 to the left end of the upper roll shaft 126. A second telescoping shaft 190 is connected at its outer end through a universal joint 192 to the drive housing output shaft 180 and at its inner end through a universal joint 194 to the left end of the lower roll shaft 124.

The reel 108, as shown best in FIG. 5, is driven from the right end of the upper conditioning roll shaft 126. A chain 196 drivingly connects a sprocket 198 on the extreme right end of the upper roll shaft 126 with a sprocket 200 on a jackshaft 202 aligned with the pivot 130 of the upper roll support arm 128. Also mounted on and rotatable with this jackshaft is a sheave 204 which is drivingly connected by means of a belt 206 to a sheave 208 on the right end of the reel shaft 140. An idler sheave 210, adjustably mounted on a bracket 212 on the right header side panel 52, is operative to maintain proper tension in the reel drive belt 206.

We claim:

1. In a crop harvesting machine having transversely extending frame means adapted to advance forwardly through a field, transversely extending cutting means mounted forwardly on said frame means and adapted to cut a swath of crop material as said frame means is advanced forwardly; drive mechanism for said cutting means mounted on the left side of said frame means and having a drive input sheave disposed in a generally longitudinal vertical plane, an upper and lower pair of transversely extending crop conditioning rolls mounted on said frame means above and rearwardly of said cutting means, one of said rolls being mounted for limited movement toward and away from the other of said rolls and having a transverse drive input shaft on the left side of said frame means, the improvement residing in drive means for said cutting means and said one conditioning roll, said drive means comprising: a drive transmission housing mounted on the left side of said frame means for vertical pivotal adjustment about a transverse axis; means connecting said drive housing and said frame means for selectively rigidly fixing said drive housing in a vertical position of adjustment relative to said frame means; a forwardly extending drive input shaft on said drive housing adapted for driving connection to a tractor power take-off shaft; a drive output sheave on said drive housing disposed above and generally in the same longitudinal vertical plane as the drive input sheave on the cutting means drive mechanism; an endless flexible drive belt drivingly connecting said drive output sheave on said drive housing and said drive input sheave on said cutting means drive mechanism, the tension in said drive belt being variable in response to vertical pivotal adjustment of said drive housing; a first transverse drive output shaft on the right side of said drive housing and generally transversely aligned with the drive input shaft of said one crop conditioning roll; and a first transverse drive connection between said first drive output shaft on said drive housing and said input shaft of said one conditioning roll, said first transverse drive connection including means for accommodating misalignment of said shafts resulting from vertical pivotal adjustment of said drive housing to vary the tension in said drive belt and movement of said one conditioning roll toward and away from said other conditioning roll.

2. The invention defined in claim 1 wherein said first transverse drive connection between said first drive output shaft on said drive housing and said drive input shaft of said one conditioning roll comprises a first telescoping shaft extending transversely between said output and input shafts; a first universal drive connection between the left end of said first telescoping shaft and the first output shaft on said drive housing; and a second universal drive connection between the right end of said first telescoping shaft and the input shaft of said one conditioning roll.

3. The invention defined in claim 1 wherein said other conditioning roll has a transverse drive input shaft on the left side of said frame means, and wherein said drive means further comprises a second transverse drive output shaft on the right side of said drive housing and generally transversely aligned with the drive input shaft of said other crop conditioning roll; and a second transverse drive connection between said second drive output shaft on said drive housing and said drive input shaft of said other conditioning roll, said second transverse drive connection including means for accommodating misalignment of said shafts resulting from vertical pivotal adjustment of said drive housing to vary the tension in said drive belt.

4. The invention defined in claim 3 wherein said second transverse drive connection between said second drive output shaft on said drive housing and said drive input shaft of said other conditioning roll comprises a second telescoping shaft extending transversely between said output and input shafts; a first universal drive connection between the left end of said second telescoping shaft and the second output shaft on said drive housing; and a second universal drive connection between the right end of said second telescoping shaft and the input shaft of said other conditioning roll.

5. The invention defined in claim 1 wherein the longitudinal distance between the drive output sheave on the drive housing and the axis of pivotal adjustment of the drive housing relative to the frame means is greater than the longitudinal distance between the first transverse drive output shaft on the drive housing and said axis of pivotal adjustment.

6. The invention defined in claim 1 wherein the drive output sheave on the drive housing is located forwardly of the axis of pivotal adjustment of the drive housing relative to the frame means.

7. The invention defined in claim 6 wherein the first transverse drive output shaft on the drive housing is located longitudinally between the drive output sheave on the drive housing and the axis of pivotal adjustment of the drive housing relative to the frame means.

8. The invention defined in claim 1 including a transverse reel mounted on said frame means above said cutting means and forwardly of said conditioning rolls and operative to transfer cut crop material from said cutting means to said conditioning rolls, said reel having a transverse drive input shaft on the right side of said frame means; wherein one of said conditioning rolls has a transverse drive output shaft on the right side of said frame means; and wherein said drive means further includes endless flexible means on the right side of said frame means drivingly connecting said reel drive input shaft and said conditioning roll drive output shaft.

9. In a crop harvesting machine having transversely extending frame means adapted to advance forwardly through a field, transversely extending cutting means mounted forwardly on said frame means and adapted to cut a swath of crop material as said frame means is advanced forwardly; drive mechanism for said cutting means mounted on the left side of said frame means and having a drive input sheave disposed in a generally longitudinal vertical plane, an upper and lower pair of transversely extending crop conditioning rolls mounted on said frame means above and rearwardly of said cutting means, one of said rolls having a transverse drive input shaft on the left side of said frame means, the improvement residing in drive means for said cutting means and said one conditioning roll; said drive means comprising: a drive transmission housing mounted on the left side of said frame means for vertical pivotal adjustment about a transverse axis; means connecting said drive housing and said frame means for selectively rigidly fixing said drive housing in a vertical position of adjustment relative to said frame means; a forwardly extending drive input shaft on said drive housing adapted for driving connection to a tractor power take-off shaft; a drive output sheave on said drive housing disposed above and generally in the same longitudinal vertical plane as the drive input sheave on the cutting means drive mechanism; an endless flexible drive belt drivingly connecting said drive output sheave on said drive housing and said drive input sheave on said cutting means drive mechanism, the tension in said drive belt being variable in response to vertical pivotal adjustment of said drive housing; a transverse drive output shaft on the right side of said drive housing and generally transversely aligned with the drive input shaft of said one crop conditioning roll; and a transverse drive connection between said drive output shaft on said drive housing and said input shaft of said one conditioning roll, said transverse drive connection including means for accommodating misalignment of said shafts resulting from vertical pivotal adjustment of said drive housing to vary the tension in said drive belt.

10. In a crop harvesting machine having frame means adapted to advance forwardly through a field, cutting means mounted on said frame means and adapted to cut a swath of crop material as said frame means is advanced forwardly, drive mechanism for said cutting means mounted on said frame means and having a drive input sheave, an upper and lower pair of crop conditioning rolls mounted on said frame means in spaced relation to said cutting means, one of said rolls having a transverse drive input shaft, the improvement residing in drive means for said cutting means and said one crop conditioning roll, said drive means comprising: a drive transmission housing mounted on said frame means for pivotal adjustment; means connecting said drive housing and said frame means for selectively rigidly fixing said drive housing in a position of adjustment relative to said frame means; a drive input shaft on said drive housing adapted for driving connection to a power source; a drive output sheave on said drive housing disposed in spaced relation to the drive input sheave on the cutting means drive mechanism; endless flexible means drivingly connecting said drive output sheave on said drive housing and said drive input sheave on said cutting means drive mechanism, the tension in said endless flexible means being variable in response to pivotal adjustment of said drive transmission housing; a drive output shaft on said drive housing and generally aligned with the drive input shaft of said one crop conditioning roll; and a drive connection between said drive output shaft on said drive housing and said drive input shaft of said one conditioning roll; and a drive connection between said drive output shaft on said drive housing and said drive input shaft of said one conditioning roll, said drive connection including means for accommodating misalignment of said shafts resulting from vertical pivotal adjustment of said drive housing to vary the tension in said endless flexible means.

11. In a crop harvesting machine having frame means adapted to advance forwardly through a field, cutting means mounted on said frame means and adapted to cut a swath of crop material as said frame means is advanced forwardly, drive mechanism for said cutting means mounted on said frame means and having a drive input sheave, an upper and lower pair of crop conditioning rolls mounted on said frame means in spaced relation to said cutting means, one of said rolls being mounted for limited movement toward and away from the other of said rolls and having a transverse drive input shaft, the improvement residing in drive means for said cutting means and said one crop conditioning roll, said drive means comprising: a drive transmission housing mounted on said frame means for pivotal adjustment; means connecting said drive housing and said frame means for selectively rigidly fixing said drive housing in a position of adjustment relative to said frame means; a drive input shaft on said drive housing adapted for driving connection to a power source; a drive output sheave on said drive housing disposed in spaced relation to the drive input sheave on the cutting means drive mechanism; endless flexible means drivingly connecting said drive output sheave on said drive housing said drive input sheave on said cutting means drive mechanism, the tension in said endless flexible means being variable in response to pivotal adjustment of said drive transmission housing; a drive output shaft on said drive housing and generally aligned with the drive input shaft of said one crop conditioning roll; a drive connection between said drive output shaft on said drive housing and said drive input shaft of said one conditioning roll, said drive connection including means for accommodating misalignment of said shafts resulting from vertical pivotal adjustment of said drive housing to vary the tension in said endless flexible means, and movement of said one conditioning roll toward and away from said other conditioning roll.

12. In a harvesting machine adapted to be towed by a tractor having a power take-off shaft and including a mobile main frame, a subframe vertically adjustably supported from the main frame and carrying a transversely extending cutting means adapted to cut a swath of crop material as the machine advances, a pair of parallel, oppositely rotatable, transversely extending, crop conditioner rolls mounted on the subframe rearwardly of the cutting means and adapted to receive the cut crop material therefrom and condition the crop as it moves rearwardly between the rolls, one of said rolls being mounted for limited movement toward and away from the other roll, the combination therewith of improved drive means for driving said cutting means and said conditioner rolls and comprising: a drive transmission means including a housing mounted on the left side of the subframe and having a forwardly extending input shaft, a cutting apparatus output shaft, a pair of transversely extending roll drive output shafts, and power transmitting means including gear means within the housing for drivingly connecting the input shaft to said output shafts; a first drive shaft means drivingly connecting the power take-off shaft to the input shaft; a first connecting means drivingly connecting the cutting apparatus output shaft to the cutting means; a second drive shaft means, including a universal joint, drivingly connecting one of the roll output shafts to said one roll; and a third drive shaft means drivingly connecting the other roll output shaft to the other roll.

13. The invention defined in claim 12 wherein the cutting apparatus output shaft extends transversely and the first connecting means includes a belt drive, the transmission means being vertically adjustable on the subframe to vary the tension in the belt drive.

14. In a harvesting machine adapted to be towed by a tractor having a power take-off shaft and including a mobile frame means, a transversely extending cutting means mounted on said frame means and adapted to cut a swath of crop material as the machine advances, a pair of parallel, oppositely rotatable, transversely extending, crop conditioner rolls mounted on the frame means rearwardly of the cutting means and adapted to receive the cut crop material therefrom and condition the crop as it moves rearwardly between the rolls, one of said rolls being mounted for limited movement toward and away from the other roll, the combination therewith of improved drive means for driving said cutting means and said conditioner rolls comprising: a drive transmission means including a housing mounted on the left side of the frame means and having a forwardly extending input shaft, a transverse cutting apparatus output shaft, and a pair of transversely extending roll drive output shafts, bevel gear means connecting the input shaft to the cutting apparatus output shaft, and spur gear means drivingly connecting the cutting apparatus output shaft to the roll drive output shafts to drive the roll drive output shafts in opposite directions; a first drive shaft means drivingly connecting the power take-off to the input shaft; a first connecting means, including a belt drive, drivingly connecting the cutting apparatus output shaft to the cutting means; a second drive shaft means including a universal joint drivingly connecting one of the roll output shafts to said one roll; and a third drive shaft means including a universal joint drivingly connecting the other roll output shaft to the other roll.

15. The invention defined in claim 14 wherein the transmission means is mounted for vertical adjustment on the frame means to vary the tension in the belt drive, the universal joints in the second and third drive shaft means accommodating the vertical adjustment of the transmission means.

* * * * *